United States Patent [19]

Coulson

[11] Patent Number: 5,802,069

[45] Date of Patent: Sep. 1, 1998

[54] IMPLEMENTING MASS STORAGE DEVICE FUNCTIONS USING HOST PROCESSOR MEMORY

[75] Inventor: Richard Coulson, Portland, Oreg.

[73] Assignee: Intel Corporation, Santa Clara, Calif.

[21] Appl. No.: 627,939

[22] Filed: Mar. 28, 1996

Related U.S. Application Data

[60] Provisional application No. 60/006,431 Nov. 10, 1995, provisional application No. 60/011,320 Feb. 8, 1996, and provisional application No. 60/013,302 Mar. 8, 1996.

[51] Int. Cl.⁶ .................................................. G06F 11/00
[52] U.S. Cl. ...................................... 371/21.1; 395/182.06
[58] Field of Search ........................ 371/21.1; 395/182.03, 395/182.05, 182.06, 183.16, 183.18; 364/238.3, 238.4, 236.2, 239

[56] References Cited

U.S. PATENT DOCUMENTS 5,257,367  10/1993  Goodlander et al. ............... 364/236.2

OTHER PUBLICATIONS

"P1394 IEEE Draft Standard for a High Performance Serial Bus," by IEEE, P1394, D8.Ov2, Jul. 1995, DS3285, pp. 1–384.

*Primary Examiner*—Vincent P. Canney
*Attorney, Agent, or Firm*—Duane, Morris & Heckscher LLP

[57] ABSTRACT

A computer system comprises a host processor, host memory, and a mass storage device interconnected via a high-speed data bus. An operating system and a driver for the mass storage device are implemented on the host processor. The mass storage device is capable of being connected to the computer system via the data bus, such that a portion of the host memory is allocated for use by the mass storage device; the mass storage device uses the host memory portion for one or more particular mass storage device operations; and the operating system and the driver are unaware of how the mass storage device uses the host memory portion. In a preferred embodiment, the mass storage device requests and the host processor allocates a portion of host memory for exclusive use by the mass storage device to perform such functions as predictive failure analysis, maintenance of deallocated sector lists, and data prefetching.

39 Claims, 5 Drawing Sheets

IMPLEMENTING MASS STORAGE DEVICE FUNCTIONS USING HOST PROCESSOR MEMORY

CROSS-REFERENCES TO RELATED APPLICATIONS

This nonprovisional U.S. national application, filed under 35 U.S.C. § 111 (a), claims, under 35 U.S.C. § 119(e)(1), the benefit of the filing dates of provisional U.S. national application Ser. No. 60/006,431, filed on Nov. 10, 1995 as attorney docket no. 366431-122P; Ser. No. 60/011,320, filed on Feb. 8, 1996 as attorney docket no. 366431-122P; and Ser. No. 60/013,302 filed on Mar. 8, 1996 as attorney docket no. 366431-122P3, all filed under 35 U.S.C. § 111(b), the teachings of which three are incorporated herein by reference.

BACKGROUND OF THE INVENTION

1. Field of the Invention

The present invention relates to computers, and, in particular, to mass storage devices for computer systems.

2. Description of the Related Art

When personal computer (PC) systems were first developed, the host processors performed most if not all of the functions for controlling the operations of mass storage devices such as hard drives. Over time, more and more of the intelligence for operating mass storage devices has been moved to the mass storage devices themselves. To support these operations, today's mass storage device has integrated device electronics (IDE) that contains both a dedicated controller (typically an application specific integrated circuit (ASIC)) and dedicated memory (typically random access memory (RAM)). The dedicated RAM, external to whatever on-chip memory exists in the ASIC, can contribute significantly to the overall cost of the mass storage device.

Objects and advantages of this invention will become apparent from the detailed description of a preferred embodiment which follows.

SUMMARY OF THE INVENTION

The present invention comprises a mass storage device for use with a computer system. According to a preferred embodiment, the computer system comprises a host processor, host memory, and a data bus. An operating system and a driver for the mass storage device are implemented on the host processor. The mass storage device is capable of being connected to the computer system via the data bus, such that a portion of the host memory is allocated for use by the mass storage device; the mass storage device uses the host memory portion for one or more particular mass storage device operations; and the operating system and the driver are unaware of how the mass storage device uses the host memory portion.

The present invention also comprises a method for operation of a mass storage device with a computer system having a host processor, host memory, and a data bus, wherein an operating system and a driver for the mass storage device are implemented on the host processor. The mass storage device receives an allocation of a portion of the host memory and then uses the host memory portion to perform one or more particular mass storage device operations, wherein the operating system and the driver are unaware of how the mass storage device uses the host memory portion.

BRIEF DESCRIPTION OF THE DRAWINGS

Other objects, features, and advantages of the present invention will become more fully apparent from the following detailed description of the preferred embodiment, the appended claims, and the accompanying drawings in which:

DESCRIPTION OF THE PREFERRED EMBODIMENT(S)

The provisional applications incorporated herein by reference provide detailed descriptions of mass storage devices according to preferred embodiments of the present invention. The preferred mass storage devices of the present invention are designed to operate in PC systems that have a high-speed bus called the Intel® Serial Express™ (SE) bus, which is also described in detail in the teachings of the provisional applications. The SE bus provides mass storage devices with direct memory access to host memory.

Figure 1:
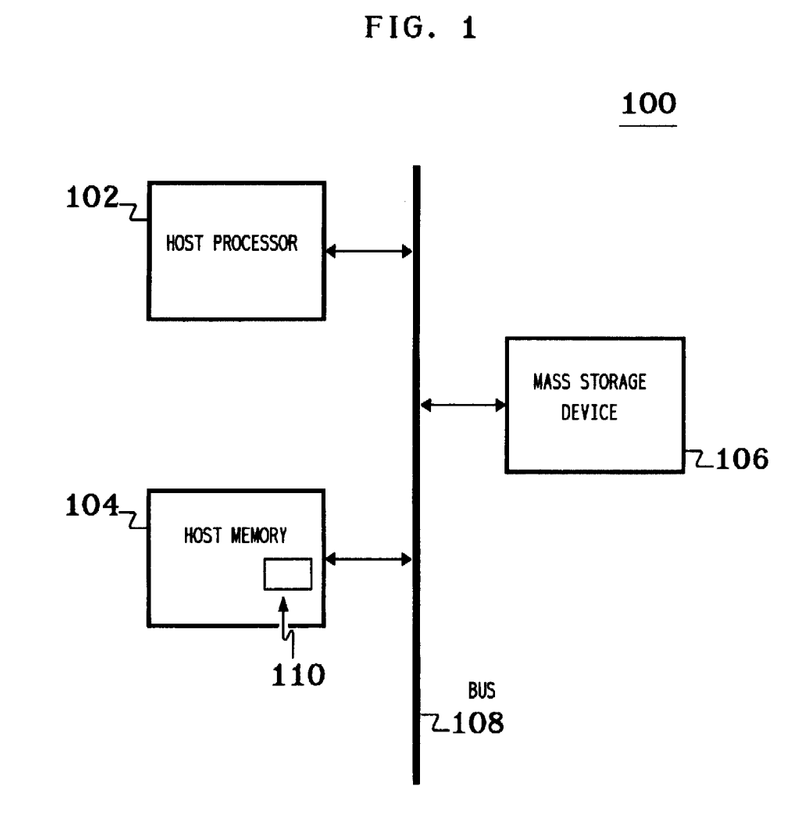
FIG. 1 is a block diagram of a PC system, according to a preferred embodiment of the present invention.

Referring now to FIG. 1, there is shown a block diagram of PC system 100, according to a preferred embodiment of the present invention. PC system 100 has host processor 102, host memory 104, and mass storage device 106, all of which are interconnected via high-speed bus 108. Host processor 102 is preferably a Pentium® or Pentium® Pro™ microprocessor manufactured by Intel Corporation and bus 108 is preferably an SE bus. Mass storage device 106 is typically a hard disk drive, but may alternatively be any other device for storing large quantities of data such as a compact disk—read only memory (CD-ROM), a compact disk—recordable (CD-R), a tape drive, or a floppy disk drive.

At configuration time, host processor 102 allocates a portion (110) of host memory 104 to mass storage device 106 for its exclusive use. Mass storage device 106 has direct memory access to memory portion 110 via bus 108. One characteristic of the present invention is that host processor 102 (in particular, the operating system and the mass storage device driver) is unaware of how mass storage device 106 uses memory portion 110. Host processor 102 knows that the memory space is allocated to mass storage device 106, but it does not know exactly how mass storage device 106 makes use of that memory space. Since mass storage device 106 makes use of memory portion 110 of host memory 104, the need for dedicated memory within the IDE of mass storage device 106, beyond that provided on chip in the IDE's ASIC, can be drastically reduced and even possibly eliminated. As a result, the cost of mass storage device 106 can also be reduced as compared to conventional mass storage devices.

According to the IEEE 1394 standard, improved data bus capabilities would enable the mass storage device to have direct access to read and write data buffers in host memory. However, because the latency of the IEEE 1394 bus is high, and because there are no mechanisms to set aside a portion of host memory for the mass storage device's private use, the dedicated RAM within the IDE of a mass storage device cannot be eliminated. There is nothing in the IEEE 1394 standard, however, that states or even implies that the host processor would be unaware of how the mass storage device would use the host memory.

To the contrary, the IEEE 1394 standard, the ANSI Small Computer System Interface (SCSI) standard, and the current PC Advanced Technologies (AT) Attachment (ATA) or IDE interface standards all require the mass storage device to manage deallocated sector lists in the mass storage device's own RAM. Other proposals call for the mass storage device driver (e.g., implemented on the host processor) to control and be responsible for the use of host memory for mass storage device operations. For example, for deallocated sector lists, the driver would be responsible for scanning the list stored in host memory before each transfer command is given to the mass storage device, so that a list of the bad sectors could be passed to the mass storage device in a command. This would require a standard, cross-vendor method of formatting a deallocated sector list. Such a standard does not exist today, in part because such a standard would reveal proprietary information about the defect management algorithms and defect frequency of different vendors products.

Figure 2:
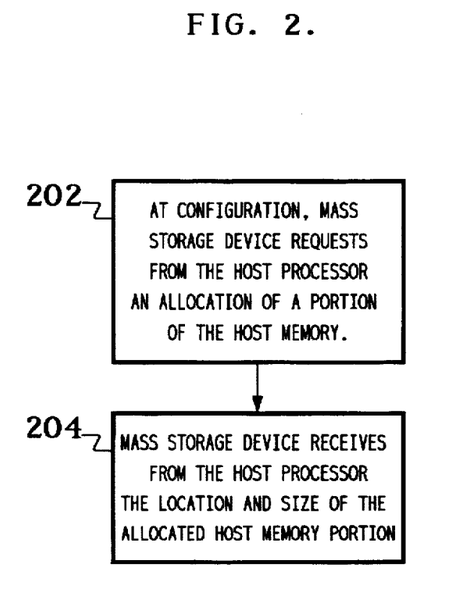
FIG. 2 is a flow diagram of processing of the mass storage device of the PC system of FIG. 1 to request and receive an allocation of a portion of the host memory of the PC system of FIG. 1 for its exclusive use.

Referring now to FIG. 2, there is shown a flow diagram of processing of mass storage device 106 of FIG. 1 to request and receive an allocation of a portion of host memory 104 for its exclusive use, according to a preferred embodiment of the present invention. At system configuration, mass storage device 106 requests from host processor 102 via bus 108 an allocation of a portion of host memory 104 (step 202 of FIG. 2). Host processor 102 processes the request and informs mass storage device 106 via bus 108 of the location and size of the allocated portion 110 of host memory 104 (step 204). Note that host processor 102 may allocate less memory space than was originally requested by mass storage device 106.

Figure 3:
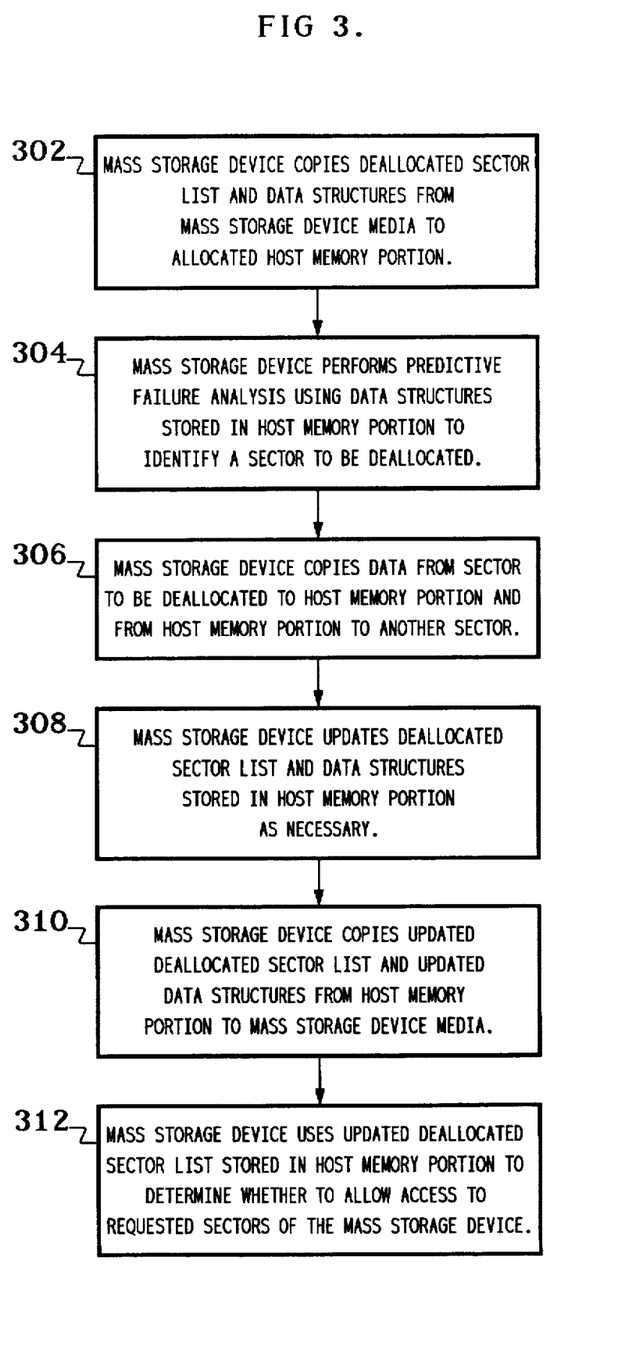
FIG. 3 is a flow diagram of processing of the mass storage device of the PC system of FIG. 1 to perform predictive failure analysis.

Referring now to FIG. 3, there is shown a flow diagram of processing of mass storage device 106 of FIG. 1 to perform predictive failure analysis, according to a preferred embodiment of the present invention. In a preferred embodiment, mass storage device 106 conforms to the self-monitoring, analysis, and reporting technology (SMART) standard (SFF 8035i).

In particular, at start-up time, mass storage device 106 copies certain data structures from its mass storage device media (i.e., the static, non-volatile memory of mass storage device 106) via bus 108 to the allocated host memory portion 110 (step 302 of FIG. 3). Under the SMART standard, the data structures include a device attributes data structure and a device attributes threshold data structure.

Mass storage device 106 performs predictive failure analysis using the data structures stored in host memory portion 110 to predict a failure of mass storage device 106 (step 304). Mass storage device 106 updates as necessary the data structures stored in host memory portion 110 to reflect the current state of the predictive failure analysis (step 306). At an appropriate time, mass storage device 106 copies the updated data structures from host memory portion 110 via bus 108 to mass storage device media for static storage (step 308).

Figure 4:
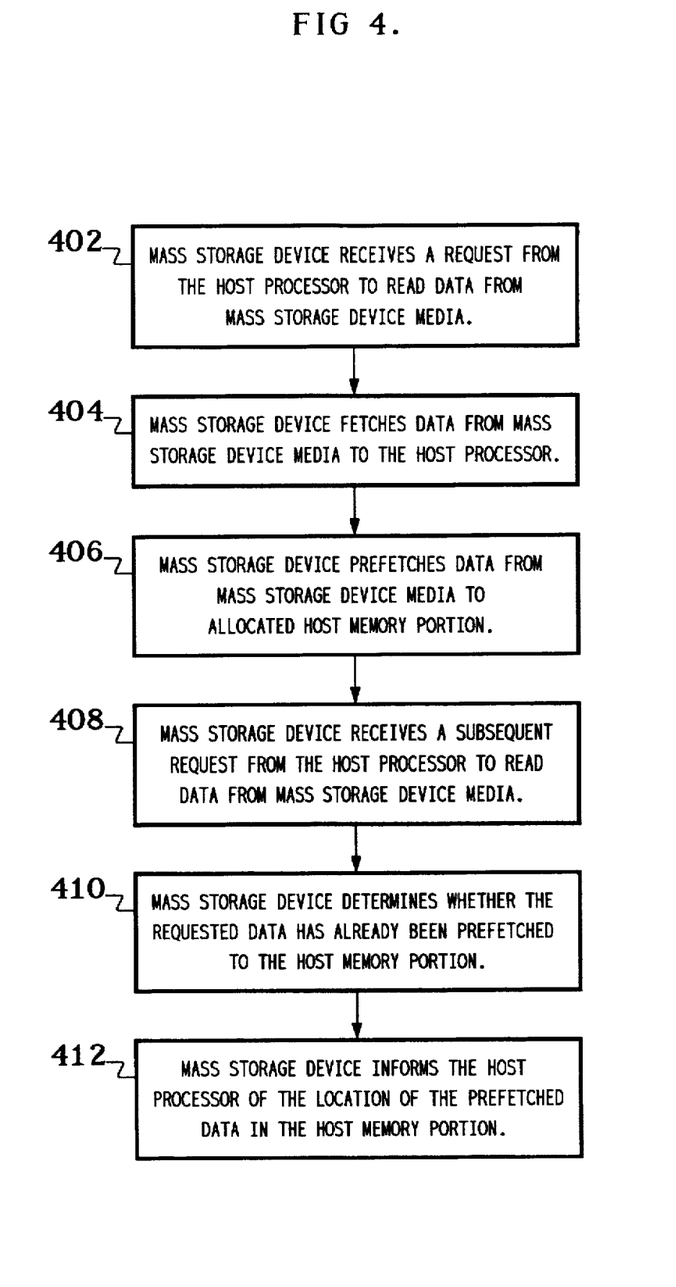
FIG. 4 is a flow diagram of processing of the mass storage device of the PC system of FIG. 1 to perform data prefetching.

Referring now to FIG. 4, there is shown a flow diagram of processing of mass storage device 106 of FIG. 1 to perform data prefetching, according to a preferred embodiment of the present invention. Mass storage device 106 receives a request from host processor 102 via bus 108 to read data from the mass storage device media into a specified location in host memory 104 (step 402 of FIG. 4). Mass storage device 106 responds by fetching the requested data from its mass storage device media to the specified location in host memory 104 via bus 108 and then informs host processor 102 of the successful completion of the data request (step 404). Those skilled in the art will understand that mass storage device 106 fetches this requested data to a location within host memory 104, but outside of allocated portion 110.

To increase average efficiency, mass storage device 106 prefetches certain data (e.g., sequential data) from its mass storage device media to the allocated host memory portion 110 via bus 108 in the expectation that host processor 102 will follow the data request of step 402 with a subsequent data request for the prefetched data (step 406). Those skilled in the art will understand that the prefetched data may be set of data following the requested data of step 402 as stored in the mass storage device media.

When mass storage device 106 receives a subsequent data request from host processor 102 via bus 108 to read data from the mass storage device media to a second specified location in host memory 104 (step 408), mass storage device 106 determines whether the newly requested data is the prefetched data already stored in host memory portion 110 (step 410). If so, then mass storage device 106 instructs host processor 102 via bus 108 to copy the prefetched data within host memory portion 110 to the second specified location within host memory 104 and then informs host processor 102 of the successful completion of the subsequent data request (step 412). Host processor 102 simply copies the prefetched data from host memory portion 110 without being aware of how mass storage device 106 is using host memory portion 110.

Figure 5:
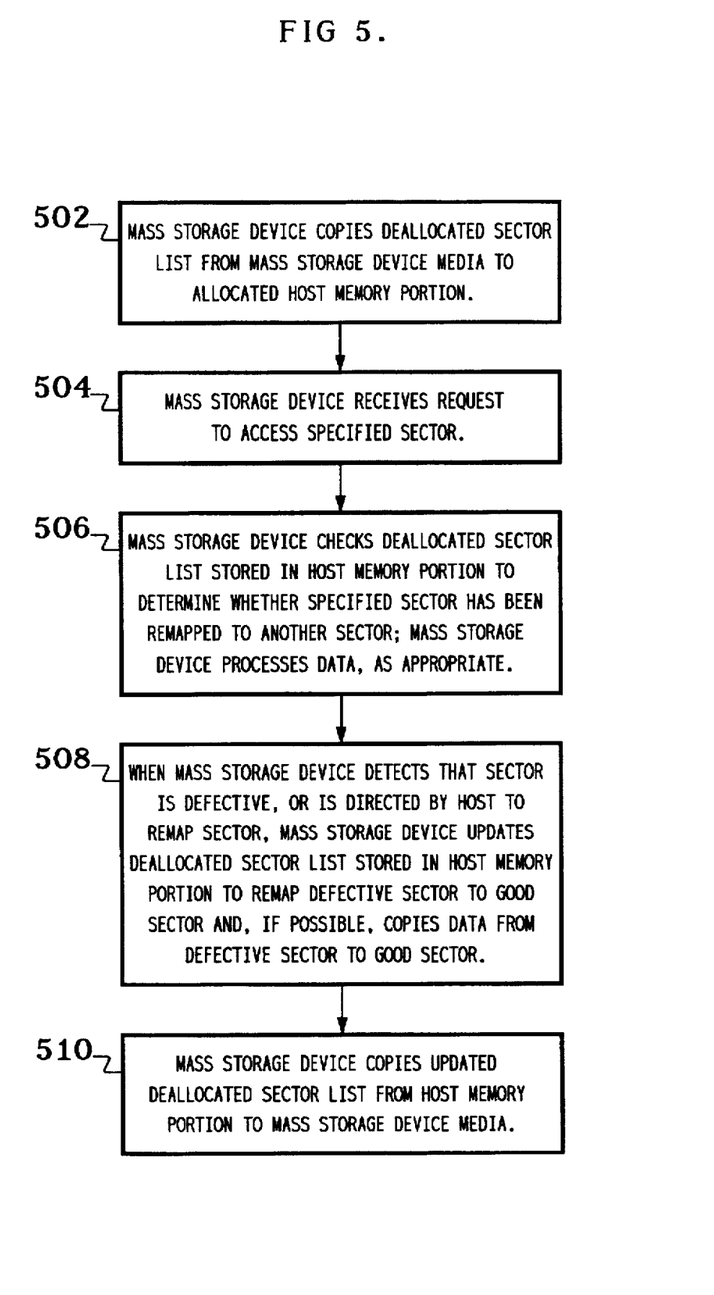
FIG. 5 is a flow diagram of processing of the mass storage device of the PC system of FIG. 1 to manage and process a deallocated sector list.

Referring now to FIG. 5, there is shown a flow diagram of processing of mass storage device 106 of FIG. 1 to manage and process a deallocated sector list, according to a preferred embodiment of the present invention. These operations include using a deallocated sector list to process data requests, maintenance of the deallocated sector list, and copying of data from newly deallocated sectors.

In particular, at start-up time, mass storage device 106 copies the deallocated sector list from its mass storage device media via bus 108 to the allocated host memory portion 110 (step 502 of FIG. 5). When mass storage device 106 receives a request to access a specified sector (i.e., either read data from the specified sector or write data to the specified sector) (step 504), mass storage device 106 checks the deallocated sector list stored in host memory portion 110 to determine whether the specified sector has been remapped to another sector and, if so, mass storage device 106 processes the data accordingly (i.e., either reads the data from the remapped sector or writes the data to the remapped sector, as appropriate) (step 506).

When mass storage device 106 detects that a sector is defective, or is directed by host processor 102 to remap a sector, mass storage device 106 updates the deallocated sector list stored in host memory portion 110 to remap the defective sector to a good sector and, if possible, mass storage device 106 copies data from the defective sector to the good sector (step 508). If necessary, mass storage device 106 uses host memory portion 110 for intermediate storage of the data being copied from the defective sector to the good sector. At an appropriate time, mass storage device 106 copies the updated deallocated sector list from host memory portion 110 via bus 108 to mass storage device media for static storage (step 510).

A conventional mass storage device relies heavily on the use of dedicated RAM memory within the IDE of the mass storage device to perform operations analogous to those of FIGS. 3–5. In a preferred embodiment of the present invention, on the other hand, mass storage device 106 uses the portion 110 of host memory 104 allocated during the processing of FIG. 2 for these operations, rather than having to rely on its own dedicated RAM memory. By reducing its internal memory requirements, in a preferred embodiment, mass storage device 106 can be implemented with all of its memory included in the IDE ASIC. As a result, the cost of mass storage devices of the present invention can be lower than the cost of conventional mass storage devices due to the elimination of external RAM and the elimination of pins to connect to the RAM component.

Moreover, host processor 102 (in particular, the operating system and mass storage device driver) is preferably unaware of how mass storage device 106 uses the allocated host memory portion 110 (other than simply reading prefetched data from portion 110 using a location provided by mass storage device 106). Mass storage device 106 alone is responsible for controlling the use of the allocated host memory portion 110. As a result, the confidentiality of proprietary information of mass storage device vendors can be maintained.

In the PC system of FIG. 1, the driver for mass storage device 106 is implemented in host processor 102. Those skilled in the art will understand that, in alternative embodiments of the present invention, the mass storage device driver may be implemented within a device distinct from host processor 102.

In the above disclosure, certain specific mass storage device operations were described that rely on host memory rather than on dedicated RAM within the mass storage device. Those skilled in the art will understand that operations other than those described earlier that have been conventionally implemented using internal dedicated RAM can instead be implemented using host memory. For example, thermal calibration data may be stored in host memory. Likewise, the host memory may be used for read caching.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A mass storage device for use with a computer system, wherein:
   the computer system comprises a host processor, host memory, and a data bus;
   an operating system and a driver for the mass storage device are implemented on the host processor; and
   the mass storage device is capable of being connected to the computer system via the data bus, such that:
   a portion of the host memory is allocated for use by the mass storage device;
   the mass storage device uses the host memory portion for one or more particular mass storage device operations; and
   the operating system and the driver are unaware of how the mass storage device uses the host memory portion.

2. The mass storage device of claim 1, wherein the mass storage device operations comprise storage of a deallocated sector list in the host memory portion.

3. The mass storage device of claim 2, wherein:
   the mass storage device copies the deallocated sector list from mass storage device media to the host memory portion;
   the mass storage device accesses the deallocated sector list stored in the host memory portion to determine whether a sector of the mass storage device has been deallocated and remapped to another sector of the mass storage device;
   the mass storage device updates the deallocated sector list stored in the host memory portion as necessary; and
   the mass storage device copies the updated deallocated sector list from the host memory portion to the mass storage device media.

4. The mass storage device of claim 1, wherein the mass storage device operations comprise copying data from a sector to be deallocated to a different sector of the mass storage device using the host memory portion.

5. The mass storage device of claim 4, wherein:
   the mass storage device copies the data from the sector to be deallocated to the host memory portion; and
   the mass storage device copies the data from the host memory portion to the different sector.

6. The mass storage device of claim 1, wherein the mass storage device operations comprise predictive failure analysis using the host memory portion.

7. The mass storage device of claim 6, wherein:
   the mass storage device copies one or more data structures from mass storage device media to the host memory portion;
   the mass storage device performs the predictive failure analysis using the data structures stored in the host memory portion;
   the mass storage device updates the data structures stored in the host memory portion as necessary; and
   the mass storage device copies the updated data structures from the host memory portion to the mass storage device media.

8. The mass storage device of claim 1, wherein the mass storage device operations comprise data prefetching using the host memory portion.

9. The mass storage device of claim 8, wherein:
   the mass storage device prefetches data from mass storage device media to the host memory portion;
   the mass storage device receives a request from the host processor to read data from the mass storage device media;
   the mass storage device determines that the data has already been prefetched to the host memory portion; and
   the mass storage device instructs the host processor to copy the prefetched data from the host memory portion.

10. The mass storage device of claim 1, wherein the host memory portion is allocated for use by the mass storage device at configuration time.

11. The mass storage device of claim 10, wherein:
   the mass storage device requests from the host processor an allocation of a portion of the host memory of requested size; and
   the mass storage device receives from the host processor identification of location and allocated size of the host memory portion.

12. The mass storage device of claim 1, wherein the mass storage device is a disk drive.

13. The mass storage device of claim 1, wherein:

the host memory portion is allocated for use by the mass storage device at configuration time, wherein:

the mass storage device requests from the host processor an allocation of a portion of the host memory of requested size; and the mass storage device receives from the host processor identification of location and allocated size of the host memory portion;

the mass storage device operations comprise storage of a deallocated sector list, wherein:

the mass storage device copies a deallocated sector list from mass storage device media to the host memory portion;

the mass storage device accesses the deallocated sector list stored in the host memory portion to determine whether a sector of the mass storage device has been deallocated and remapped to another sector of the mass storage device;

the mass storage device updates the deallocated sector list stored in the host memory portion as necessary; and the mass storage device copies the updated deallocated sector list from the host memory portion to the mass storage device media;

the mass storage device operations further comprise copying data from a sector to be deallocated to a different sector of the mass storage device, wherein:

the mass storage device copies the data from the sector to be deallocated to the host memory portion; and the mass storage device copies the data from the host memory portion to the different sector;

the mass storage device operations further comprise predictive failure analysis, wherein:

the mass storage device copies one or more data structures from mass storage device media to the host memory portion;

the mass storage device performs predictive failure analysis using the data structures stored in the host memory portion;

the mass storage device updates the data structures stored in the host memory portion as necessary; and the mass storage device copies the updated data structures from the host memory portion to the mass storage device media; and the mass storage device operations further comprise data prefetching, wherein:

the mass storage device prefetches data from mass storage device media to the host memory portion;

the mass storage device receives a request from the host processor to read data from the mass storage device media;

the mass storage device determines that the data has already been prefetched to the host memory portion; and the mass storage device instructs the host processor to copy the prefetched data from the host memory portion.

14. A method for operation of a mass storage device with a computer system having a host processor, host memory, and a data bus, wherein an operating system and a driver for the mass storage device are implemented on the host processor, the method comprising the steps of:

(a) receiving by the mass storage device an allocation of a portion of the host memory; and (b) using the host memory portion by the mass storage device to perform one or more particular mass storage device operations, wherein the operating system and the driver are unaware of how the mass storage device uses the host memory portion.

15. The method of claim 14, wherein the mass storage device operations comprise storage of a deallocated sector list in the host memory portion.

16. The method of claim 15, wherein:

the mass storage device copies the deallocated sector list from mass storage device media to the host memory portion;

the mass storage device accesses the deallocated sector list stored in the host memory portion to determine whether a sector of the mass storage device has been deallocated and remapped to another sector of the mass storage device;

the mass storage device updates the deallocated sector list stored in the host memory portion as necessary; and the mass storage device copies the updated deallocated sector list from the host memory portion to the mass storage device media.

17. The method of claim 14, wherein the mass storage device operations comprise copying data from a sector to be deallocated to a different sector of the mass storage device using the host memory portion.

18. The method of claim 17, wherein:

the mass storage device copies the data from the sector to be deallocated to the host memory portion; and the mass storage device copies the data from the host memory portion to the different sector.

19. The method of claim 14, wherein the mass storage device operations comprise predictive failure analysis using the host memory portion.

20. The method of claim 19, wherein:

the mass storage device copies one or more data structures from mass storage device media to the host memory portion;

the mass storage device performs the predictive failure analysis using the data structures stored in the host memory portion;

the mass storage device updates the data structures stored in the host memory portion as necessary; and the mass storage device copies the updated data structures from the host memory portion to the mass storage device media.

21. The method of claim 14, wherein the mass storage device operations comprise data prefetching using the host memory portion.

22. The method of claim 21, wherein:

the mass storage device prefetches data from mass storage device media to the host memory portion;

the mass storage device receives a request from the host processor to read data from the mass storage device media;

the mass storage device determines that the data has already been prefetched to the host memory portion; and the mass storage device instructs the host processor to copy the prefetched data from the host memory portion.

23. The method of claim 14, wherein the host memory portion is allocated for use by the mass storage device at configuration time.

24. The method of claim 23, wherein:

the mass storage device requests from the host processor an allocation of a portion of the host memory of requested size; and the mass storage device receives from the host processor identification of location and allocated size of the host memory portion.

25. The method of claim 14, wherein the mass storage device is a disk drive.

26. The method of claim 14, wherein:
the host memory portion is allocated for use by the mass storage device at configuration time, wherein:
the mass storage device requests from the host processor an allocation of a portion of the host memory of requested size; and
the mass storage device receives from the host processor identification of location and allocated size of the host memory portion;
the mass storage device operations comprise storage of a deallocated sector list, wherein:
the mass storage device copies a deallocated sector list from mass storage device media to the host memory portion;
the mass storage device accesses the deallocated sector list stored in the host memory portion to determine whether a sector of the mass storage device has been deallocated and remapped to another sector of the mass storage device;
the mass storage device updates the deallocated sector list stored in the host memory portion as necessary; and
the mass storage device copies the updated deallocated sector list from the host memory portion to the mass storage device media;
the mass storage device operations further comprise copying data from a sector to be deallocated to a different sector of the mass storage device, wherein:
the mass storage device copies the data from the sector to be deallocated to the host memory portion; and
the mass storage device copies the data from the host memory portion to the different sector;
the mass storage device operations further comprise predictive failure analysis, wherein:
the mass storage device copies one or more data structures from mass storage device media to the host memory portion;
the mass storage device performs predictive failure analysis using the data structures stored in the host memory portion;
the mass storage device updates the data structures stored in the host memory portion as necessary; and
the mass storage device copies the updated data structures from the host memory portion to the mass storage device media; and
the mass storage device operations further comprise data prefetching, wherein:
the mass storage device prefetches data from mass storage device media to the host memory portion;
the mass storage device receives a request from the host processor to read data from the mass storage device media;
the mass storage device determines that the data has already been prefetched to the host memory portion; and
the mass storage device instructs the host processor to copy the prefetched data from the host memory portion.

27. A mass storage device for use with a computer system having a host processor, host memory, and a data bus, wherein an operating system and a driver for the mass storage device are implemented on the host processor, the mass storage device comprising:
(a) means for receiving an allocation of a portion of the host memory; and
(b) means for using the host memory portion to perform one or more particular mass storage device operations, wherein the operating system and the driver are unaware of how the mass storage device uses the host memory portion.

28. The mass storage device of claim 27, wherein the mass storage device operations comprise storage of a deallocated sector list in the host memory portion.

29. The mass storage device of claim 28, wherein:
the mass storage device copies the deallocated sector list from mass storage device media to the host memory portion;
the mass storage device accesses the deallocated sector list stored in the host memory portion to determine whether a sector of the mass storage device has been deallocated and remapped to another sector of the mass storage device;
the mass storage device updates the deallocated sector list stored in the host memory portion as necessary; and
the mass storage device copies the updated deallocated sector list from the host memory portion to the mass storage device media.

30. The mass storage device of claim 27, wherein the mass storage device operations comprise copying data from a sector to be deallocated to a different sector of the mass storage device using the host memory portion.

31. The mass storage device of claim 30, wherein:
the mass storage device copies the data from the sector to be deallocated to the host memory portion; and
the mass storage device copies the data from the host memory portion to the different sector.

32. The mass storage device of claim 27, wherein the mass storage device operations comprise predictive failure analysis using the host memory portion.

33. The mass storage device of claim 32, wherein:
the mass storage device copies one or more data structures from mass storage device media to the host memory portion;
the mass storage device performs the predictive failure analysis using the data structures stored in the host memory portion;
the mass storage device updates the data structures stored in the host memory portion as necessary; and
the mass storage device copies the updated data structures from the host memory portion to the mass storage device media.

34. The mass storage device of claim 27, wherein the mass storage device operations comprise data prefetching using the host memory portion.

35. The mass storage device of claim 34, wherein:
the mass storage device prefetches data from mass storage device media to the host memory portion;
the mass storage device receives a request from the host processor to read data from the mass storage device media;
the mass storage device determines that the data has already been prefetched to the host memory portion; and
the mass storage device instructs the host processor to copy the prefetched data from the host memory portion.

36. The mass storage device of claim 27, wherein the host memory portion is allocated for use by the mass storage device at configuration time.

37. The mass storage device of claim 36, wherein:
the mass storage device requests from the host processor an allocation of a portion of the host memory of requested size; and
the mass storage device receives from the host processor identification of location and allocated size of the host memory portion.

38. The mass storage device of claim 27, wherein the mass storage device is a disk drive.

39. The mass storage device of claim 27, wherein:
the host memory portion is allocated for use by the mass storage device at configuration time, wherein:
 the mass storage device requests from the host processor an allocation of a portion of the host memory of requested size; and
 the mass storage device receives from the host processor identification of location and allocated size of the host memory portion;
the mass storage device operations comprise storage of a deallocated sector list, wherein:
 the mass storage device copies a deallocated sector list from mass storage device media to the host memory portion;
 the mass storage device accesses the deallocated sector list stored in the host memory portion to determine whether a sector of the mass storage device has been deallocated and remapped to another sector of the mass storage device;
 the mass storage device updates the deallocated sector list stored in the host memory portion as necessary; and
 the mass storage device copies the updated deallocated sector list from the host memory portion to the mass storage device media;
the mass storage device operations further comprise copying data from a sector to be deallocated to a different sector of the mass storage device, wherein:
 the mass storage device copies the data from the sector to be deallocated to the host memory portion; and
 the mass storage device copies the data from the host memory portion to the different sector;
the mass storage device operations further comprise predictive failure analysis, wherein:
 the mass storage device copies one or more data structures from mass storage device media to the host memory portion;
 the mass storage device performs predictive failure analysis using the data structures stored in the host memory portion;
 the mass storage device updates the data structures stored in the host memory portion as necessary; and
 the mass storage device copies the updated data structures from the host memory portion to the mass storage device media; and
the mass storage device operations further comprise data prefetching, wherein:
 the mass storage device prefetches data from mass storage device media to the host memory portion;
 the mass storage device receives a request from the host processor to read data from the mass storage device media;
 the mass storage device determines that the data has already been prefetched to the host memory portion; and
 the mass storage device instructs the host processor to copy the prefetched data from the host memory portion.

* * * * *